(12) United States Patent
Matsumura et al.

(10) Patent No.: US 12,108,391 B2
(45) Date of Patent: Oct. 1, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 467 days.

(21) Appl. No.: 17/432,596

(22) PCT Filed: Feb. 22, 2019

(86) PCT No.: PCT/JP2019/006904
§ 371 (c)(1),
(2) Date: Aug. 20, 2021

(87) PCT Pub. No.: WO2020/170450
PCT Pub. Date: Aug. 27, 2020

(65) Prior Publication Data
US 2022/0150929 A1 May 12, 2022

(51) Int. Cl.
*H04W 72/1273* (2023.01)
*H04L 5/00* (2006.01)
*H04W 24/08* (2009.01)
*H04W 72/0453* (2023.01)
*H04W 72/23* (2023.01)

(52) U.S. Cl.
CPC ....... *H04W 72/1273* (2013.01); *H04L 5/0051* (2013.01); *H04W 24/08* (2013.01); *H04W 72/0453* (2013.01); *H04W 72/23* (2023.01)

(58) Field of Classification Search
CPC ............ H04W 72/1273; H04W 72/23; H04W 72/0453
See application file for complete search history.

(56) References Cited

U.S. PATENT DOCUMENTS

2015/0110032 A1* 4/2015 Nagata .................. H04W 72/23
370/329
2018/0343653 A1* 11/2018 Guo ..................... H04W 72/542
2021/0258809 A1* 8/2021 Gao ....................... H04L 5/0057

OTHER PUBLICATIONS

Office Action issued in Chinese Application No. 201980095664.1, dated Jun. 20, 2023 (17 pages).
(Continued)

*Primary Examiner* — James P Duffy
(74) *Attorney, Agent, or Firm* — Osha Bergman Watanabe & Burton LLP

(57) ABSTRACT

A user terminal according to one aspect of the present disclosure includes: a reception section which monitors a first downlink control channel for cross-carrier scheduling in a first cell; and a control section which assumes that transmission configuration indication (TCI) field information indicating whether a TCI field exists in downlink control information is set to be enabled when a downlink shared channel of a second cell is scheduled by the downlink control information in the first downlink control channel and the second cell is different from the first cell. According to one aspect of the present disclosure, the information about the QCL can be appropriately determined when the user terminal configures the cross-carrier scheduling.

6 Claims, 7 Drawing Sheets

(56) References Cited

OTHER PUBLICATIONS

3GPP TSG RAN WG1 Meeting #96; R1-1901755 "Draft CR on QCL indication for PDSCH with slot aggregation" ZTE; Athens, Greece; Feb. 25-Mar. 1, 2019 (2 pages).
3GPP TSG-RAN WG1 Meeting #95; Tdoc R1-1814065 "Summary of view for beam measurement and reporting—v2" Ericsson; Spokane, USA; Nov. 8-12, 2018 (12 pages).
3GPP TSG-RAN WG1 Meeting #94; Tdoc R1-1809864 "Feature lead summary for beam management—Thursday" Ericsson; Gothenburg; Aug. 20-24, 2018 (26 pages).
Extended European Search Report issued in European Application No. 19916402.1, dated Aug. 16, 2022 (10 pages).
Office Action issued in Japanese Application No. 2021-501365; Dated Sep. 27, 2022 (10 pages).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued in corresponding International Application No. PCT/JP2019/006904 mailed Apr. 16. 2019 (4 pages).
Written Opinion of the International Searching Authority issued in corresponding International Application No. PCT/JP2019/006904 mailed Apr. 16, 2019 (3 pages).

\* cited by examiner

USER TERMINAL AND RADIO COMMUNICATION METHOD

TECHNICAL FIELD

The present disclosure relates to a user terminal and a radio communication method in a next-generation mobile communication system.

BACKGROUND ART

In a universal mobile telecommunications system (UMTS) network, specifications of long term evolution (LTE) have been drafted for the purpose of further increasing a data rate, providing low latency, and the like (see Non Patent Literature 1). Further, the specifications of LTE-Advanced (third generation partnership project (3GPP) Release. (Rel.) 10 to 14) have been drafted for the purpose of further increasing capacity and advancement of LTE (3GPP Rel. 8 and 9).

Successor systems to LTE (e.g., also referred to as 5th generation mobile communication system (5G), 5G+ (plus), new radio (NR), or 3GPP Rel. 15 or later) are also being studied.

In an existing LTE system (e.g., LTE Rel. 8 to 14), a user terminal (user equipment (UE)) controls transmission of an uplink shared channel (e.g., physical uplink shared channel (PUSCH)) based on downlink control information (DCI).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., NR), studies are underway to allow a UE to control, based on information about a quasi-co-location (QCL) of at least one of a signal and a channel (expressed as a signal/channel), reception processing (e.g., demapping, demodulation, decoding, reception beam formation, and the like) and transmission processing (e.g., mapping, modulation, coding, precoding, Tx beam formation, and the like) of the signal/channel.

However, when the UE is configured with cross-carrier scheduling, an operation of determining the information about the QCL is not clear. If it is difficult to appropriately determine the QCL, there is a possibility that degradation of system performance such as degradation of frequency utilization efficiency is caused.

Therefore, an object of the present disclosure is to provide a user terminal and a radio communication method that appropriately determine information about a QCL in a case where cross-carrier scheduling is configured.

Solution to Problem

A user terminal according to one aspect of the present disclosure includes: a reception section which monitors a first downlink control channel for cross-carrier scheduling in a first cell; and a control section which assumes that transmission configuration indication (TCI) field information indicating whether a TCI field exists in downlink control information is set to be enabled when a downlink shared channel of a second cell is scheduled by the downlink control information in the first downlink control channel and the second cell is different from the first cell.

Advantageous Effects of Invention

According to one aspect of the present disclosure, the information about the QCL can be appropriately determined when the user terminal configures the cross-carrier scheduling.

Figure 1A:
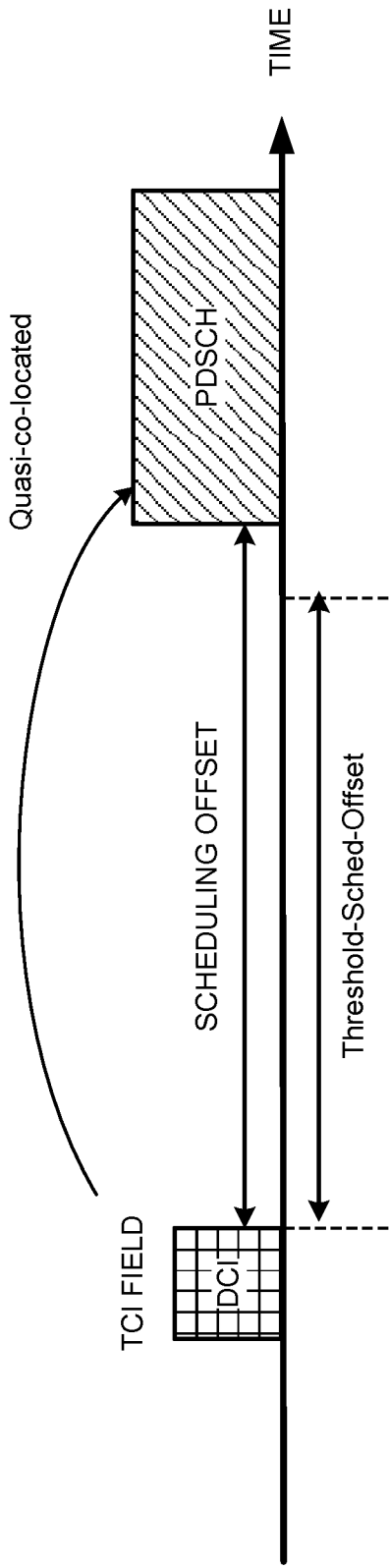
FIGS. 1A and 1B are diagrams illustrating examples of a QCL assumption of a DMRS port of PDSCH.

DESCRIPTION OF EMBODIMENTS (TCI, Spatial Relation, and QCL)

In NR, studies are underway to control reception processing (e.g., at least one of reception, demapping, demodulation, and decoding) and transmission processing (e.g., at least one of transmission, mapping, precoding, modulation, and coding) in UE of at least one of a signal and a channel (expressed as a signal/channel) based on a transmission configuration indication state (TCI state).

The TCI state may represent what is applied to a downlink signal/channel. One corresponding to the TCI state applied to an uplink signal/channel may be expressed as a spatial relation.

The TCI state is information about a quasi-co-location (QCL) of the signal/channel, and may also be referred to as, for example, a spatial Rx parameter, spatial relation information (SRI), or the like. The TCI state may be configured in UE for each channel or each signal.

The QCL is an indicator indicating a statistical property of a signal/channel. For example, a case where one signal/channel and another signal/channel have a QCL relation may mean that it is possible to assume that at least one of Doppler shift, Doppler spread, an average delay, a delay spread, or a spatial parameter (e.g., a spatial Rx parameter) is identical (in QCL with respect to at least one of these) between the plurality of different signals/channels.

Note that the spatial Rx parameter may correspond to a reception beam of the UE (e.g., a reception analog beam), and the beam may be identified based on spatial QCL. The QCL (or at least one element of the QCL) in the present disclosure may be replaced with the spatial QCL (sQCL).

A plurality of types of QCL (QCL types) may be defined. For example, four QCL types A to D with different parameters (or parameter sets) that can be assumed to be identical may be provided. These parameters are as follows:

QCL type A: Doppler shift, Doppler spread, average delay, and delay spread;
QCL Type B: Doppler shift and Doppler spread;
QCL type C: Doppler shift and average delay; and
QCL type D: spatial Rx parameter.

Note that it may be referred to as a QCL assumption for UE to assume that a given control resource set (CORESET), channel, or reference signal has a specific QCL (e.g., QCL type D) relation with another CORESET, channel, or reference signal.

The TCI state may be information (e.g., a DL-RS, a QCL type, a cell in which a DL-RS is transmitted, or the like) about a reception beam (spatial domain reception filter) indicated (configured) for the UE. The QCL assumption is based on transmission or reception of an associated signal (e.g., PRACH), and may be information (e.g., a DL-RS, a QCL type, a cell in which a DL-RS is transmitted, or the like) about a reception beam (spatial domain reception filter) assumed by the UE.

The UE may determine at least one of a Tx beam (Tx beam) and a reception beam (Rx beam) of a signal/channel based on a TCI state of the signal/channel or the QCL assumption.

The TCI state may be, for example, information about QCL of a target channel (or a reference signal (RS) for the channel) and another signal (e.g., another downlink reference signal (DL-RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

The MAC signaling may use, for example, a MAC control element (MAC CE), a MAC protocol data unit (PDU), and the like. The broadcast information may be, for example, a master information block (MIB), a system information block (SIB), remaining minimum system information (RMSI), other system information (OSI), and the like.

The physical layer signaling may be, for example, downlink control information (DCI).

A channel for which a TCI state is configured (indicated) may be, for example, at least one of a physical downlink shared channel (PDSCH), a physical downlink control channel (PDCCH), a physical uplink shared channel (PUSCH), and a physical uplink control channel (PUCCH).

Further, RS (DL-RS) that has a QCL relation with the channel may be, for example, at least one of a synchronization signal block (SSB), a channel state information reference signal (CSI-RS), and a sounding reference signal (SRS). Alternatively, the DL-RS may be a CSI-RS (also referred to as a tracking reference signal (TRS)) used for tracking or a reference signal (also referred to as a QRS) used for QCL detection.

The SSB is a signal block including at least one of a primary synchronization signal (PSS), a secondary synchronization signal (SSS), and a physical broadcast channel (PBCH). The SSB may be referred to as an SS/PBCH block.

An information element in a TCI state configured by higher layer signaling ("TCI state IE" of RRC) may include one or more pieces of QCL information ("QCL-Info"). The QCL-Info may include at least one of information about DL-RS having a QCL relation (DL-RS-related information) and information indicating a QCL type (QCL type information). The DL-RS-related information may include information such as an index of the DL-RS (e.g., an SSB index or a non-zero-power (NZP) CSI-RS resource identifier (ID)), an index of a cell where the RS is located, or an index of a bandwidth part (BWP) where the RS is located.

<TCI State for PDCCH>

Information about a QCL between PDCCH (or a demodulation reference signal (DMRS) antenna port related to the PDCCH) and a given DL-RS may be referred to as a TCI state for the PDCCH.

UE may determine a TCI state for UE-specific PDCCH (CORESET) based on higher layer signaling. In one example, for the UE, one or a plurality of (K) TCI states can be configured for each CORESET by RRC signaling.

The UE may cause one of the plurality of TCI states configured by RRC signaling to be activated by the MAC CE for each CORESET. The MAC CE may be referred to as a TCI state indication for UE-specific PDCCH MAC CE. UE may monitor CORESET based on an active TCI state corresponding to the CORESET.

<TCI State for PDSCH>

Information about PDSCH (or a DMRS antenna port associated with the PDSCH) and a QCL with a given DL-RS may be referred to as a TCI state for the PDSCH.

UE may be notified of M (M≥1) TCI states for PDSCH (QCL information for M PDSCHs) by higher layer signaling (M (M≥1) TCI states for PDSCH (QCL-Info for M PDSCHs) may be configured by higher layer signaling). Note that the number M of TCI states configured for UE may be limited by at least one of UE capability and a QCL type.

DCI used for scheduling of PDSCH may include a given field (which may be referred to as, for example, a TCI field, a TCI state field, or the like) indicating a TCI state for the PDSCH. The DCI may be used for scheduling PDSCH of one cell, and may be referred to as, for example, DL DCI, DL assignment, DCI format 1_0, or DCI format 1_1.

Whether or not the TCI field is included in the DCI may be controlled by information provided from a base station to the UE. The information may be TCI field information (TCI-PresentInDCI) indicating whether a TCI field is present or absent in the DCI. The TCI field information may be configured in the UE by, for example, higher layer signaling.

When more than eight types of TCI states are configured for UE, MAC CE may be used to activate (or specify) eight or less TCI states. The MAC CE may be referred to as a TCI states activation/deactivation for UE-specific PDSCH MAC CE. A value of the TCI field in DCI may indicate one of the TCI states activated by MAC CE.

If a time offset between reception of DL DCI and reception of PDSCH corresponding to the DCI is equal to or greater than a given threshold value, the UE may assume that the DM-RS ports of PDSCH of a serving cell are quasi co-located with the RS(s) in the TCI state with respect to the QCL type parameter(s) given by the TCI state indicated by the DCI.

The time offset between the reception of the DL DCI and the reception of the PDSCH corresponding to the DCI may be referred to as a scheduling offset.

Further, the above-mentioned given threshold value may be referred to as "threshold", "threshold for offset between a DCI indicating a TCI state and PDSCH scheduled by the DCI", "threshold-Sched-Offset", a schedule offset threshold value, a scheduling offset threshold value, an offset threshold value, or the like.

The scheduling offset threshold value may be based on the UE capability, and may be based on, for example, the delay caused by decoding the PDCCH and beam switching. The information of the scheduling offset threshold value may be configured from the base station using higher layer signaling, or may be transmitted from the UE to the base station.

Further, if the scheduling offset is less than the scheduling offset threshold value, the UE may assume that the DM-RS ports of PDSCH of a serving cell are quasi co-located with the RS(s) in the TCI state with respect to the QCL parameter (s) used for PDCCH quasi co-location indication of the lowest CORESET-ID in the latest slot in which one or more CORESETs within the active BWP of the serving cell are configured for the UE.

For example, the UE may assume that the DMRS ports of PDSCH are quasi co-located with the DL-RS based on the TCI state activated for the CORESET corresponding to the lowest CORESET-ID. The latest slot may be, for example, a slot that receives the DCI that schedules the PDSCH.

Note that the CORESET-ID may be an ID (ID for identifying CORESET) configured by the RRC information element "ControlResourceSet".

When no TCI field information is configured for CORESET scheduling PDSCH or PDSCH is scheduled by the DCI format 1_0 and the scheduling offset is equal to or greater than the scheduling offset threshold value, the UE may assume that a TCI state or a QCL assumption for the PDSCH is the same as a TCI state or a QCL assumption applied to the CORESET used for the PDCCH transmission.

In FIG. 1A, the scheduling offset is equal to or greater than the scheduling offset threshold value. Therefore, the UE may assume that the DMRS ports of PDSCH are quasi co-located with the RS in the TCI state with respect to the QCL type parameter given by the TCI state indicated by the corresponding DCI.

Figure 1B:
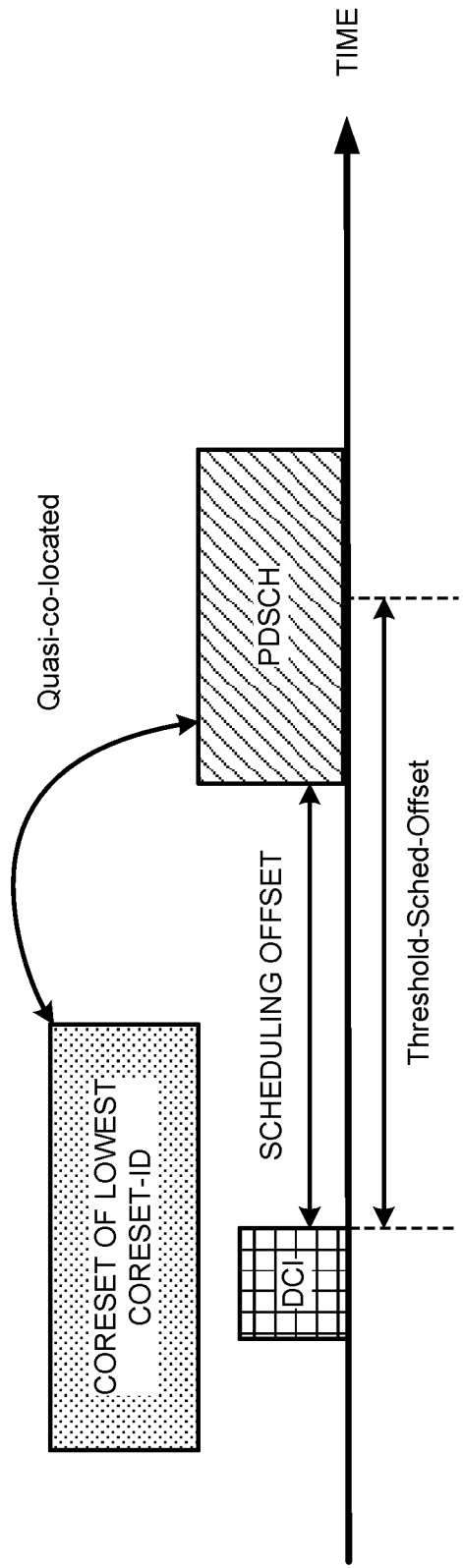

In FIG. 1B, the scheduling offset is smaller than the scheduling offset threshold value. Therefore, the UE may assume that the DMRS ports of PDSCH are quasi co-located with the RS(s) (e.g., DMRS for PDCCH) in the TCI state for PDCCH corresponding to the lowest CORESET-ID in the latest slot.

<RS of QCL Type A and RS of QCL Type D in TCI State>

In Rel. 15, both RS of QCL type A and RS of QCL type D, or only the RS of QCL type A is set as a TCI state for at least one of PDCCH and PDSCH.

When TRS is set as the RS of QCL type A, the TRS is different from DMRS of the PDCCH or the PDSCH, and it is assumed that the same TRS is periodically transmitted for a long time. UE may measure the TRS and calculate an average delay, a delay spread, and the like. The UE for which the TRS is configured as the RS of QCL type A in the TCI state of the DMRS of the PDCCH or the PDSCH can assume that parameters (an average delay, a delay spread, and the like) of QCL type A are the same between the DMRS of the PDCCH or the PDSCH and the TRS, and thus, can obtain the parameters (an average delay, a delay spread, and the like) of QCL type A of the DMRS of the PDCCH or the PDSCH from the measurement result of the TRS. When performing channel estimation of at least one of the PDCCH and the PDSCH, the UE can perform channel estimation with higher accuracy using the measurement result of the TRS.

UE for which RS of QCL type D has been configured can determine a UE reception beam (spatial domain reception filter, UE spatial domain reception filter) using the RS of QCL type D and determine a monitoring occasion (type 0-PDCCH monitoring occasion) of search space zero of CORESET zero.

A TCI state for at least one of PDCCH and PDSCH may indicate RS and a serving cell of UE for which the RS is configured. Only when a QCL type has been set to type C or type D, the RS may be located in a serving cell other than a cell in which the TCI state has been configured. Therefore, in carrier aggregation (CA), RS of QCL type A configured as a TCI state of a secondary cell (SCell) may be TRS of the SCell. The TRS may be transmitted in the SCell to configure the RS of QCL Type A in at least one TCI state of the PDCCH and the PDSCH in the SCell for the UE.

For DMRS of PDCCH, UE may expect that a TCI state indicates any one of the following QCL types:

QCL type A with a CSI-RS resource in an NZP-CSI-RS resource set in which a higher layer parameter trs-Info (TRS information) is configured, and QCL Type D with same CSI-RS resource if available QCL type A with a CSI-RS resource in an NZP-CSI-RS resource set in which an upper layer parameter trs-Info is configured, and QCL type D with a CSI-RS resource in an NZP-CSI-RS resource set in which higher layer parameter repetition (repetition) is configured if available.

QCL type A with a CSI-RS resource in an NZP-CSI-RS resource set in which neither a higher layer parameter trs-Info nor an upper layer parameter repetition is configured and QCL type D with the same CSI-RS resource if available.

The trs-Info configured in the NZP-CSI-RS resource set may indicate that antenna ports for all NZP-CSI-RS resources in the NZP-CSI-RS resource set are the same. When repetition is set in an NZP-CSI-RS resource set, an NZP-CSI-RS resource in the NZP-CSI-RS resource set may be transmitted using the same DL spatial domain transmission filter (base station spatial domain transmission filter, base station Tx beam) and the same number of ports in all symbols.

A TCI state for DMRS of PDSCH is also similar to the TCI state for the DMRS of the PDCCH.

(Cross-Carrier Scheduling)

UE may be configured with cross-carrier scheduling configuration information (e.g., CrossCarrierSchedulingConfig) for a serving cell. The cell in which the cross-carrier scheduling configuration information is configured and PDSCH is scheduled may be referred to as a scheduled cell, a scheduled CC, or the like. A cell to which PDCCH (DCI) for scheduling the PDSCH is transmitted may be referred to as a scheduling cell, a scheduling CC, or the like.

The cross-carrier scheduling configuration information for the serving cell may include scheduling cell information (schedulingCellInfo) about the scheduling cell. Scheduling cell information (own) in a case where the scheduling cell is the same as the serving cell (self-scheduling) may include CIF-presence information (cif-Presence) indicating whether a carrier indicator field (CIF) is present or absent in the scheduling DCI. Scheduling cell information (other) in a case where the scheduling cell is different from the serving cell may indicate a scheduling cell ID (schedulingCellId) indicating which cell provides notification of DL allocation and UL grant (scheduling cell), and a CIF value (cif-InSchedulingCell, e.g. 1 to 7) used in the scheduling cell (for indicating the serving cell as the scheduled cell in the DCI of the scheduling cell) to indicate the grant or assignment available to the serving cell. When the CIF-presence information is set to true, a CIF value indicating the grant or assignment with respect to the scheduling cell may be zero.

When the UE is configured with the cross-carrier scheduling configuration information for the serving cell, the CIF in the DCI may correspond to a value indicated by the cross-carrier scheduling setting information.

if the UE is configured with CIF in an active DL BWP in which the UE monitors PDCCH in a UE individual search space (USS) in the serving cell, the UE may monitor a PDCCH candidate having the CIF. A CCE index corresponding to the PDCCH candidate of a search space set in a slot for the active DL BWP of the serving cell corresponding to a CIF value is given to the search space associated with CORESET.

In the cross-carrier scheduling, when the scheduling cell of PDCCH is different from the scheduled cell of PDSCH, it is difficult to assume that a DMRS port of the PDSCH has a QCL with RS in a TCI state of the PDCCH with respect to QCL type D. In particular, there is a possibility that inter-band CA does not normally operate.

When UE is configured with CORESET associated with the search space set for cross-carrier scheduling, the UE may assume that the TCI field information (tci-PresentInDCi) is set to be enabled for the CORESET. The UE may further assume that the scheduling offset is equal to or greater than the scheduling threshold value when one or more TCI states configured for the serving cell scheduled by the search space set include information ('QCL-TypeD') indicating a QCL type D parameter. When the TCI state for the serving cell includes the information indicating the QCL type D parameter, a frequency of the serving cell may be in frequency range 2 (FR2). FR2 may be a frequency higher than 6 GHz or a frequency higher than 24 GHz.

However, even in a case where the scheduling cell is the same as the scheduled cell, scheduling of the PDSCH is limited if a constraint of the scheduling offset is applied, and there is a possibility that frequency utilization efficiency deteriorates. For example, when the subcarrier spacing (SCS) is 120 kHz, the scheduling offset threshold value is equal to or greater than fourteen symbols, PDSCH is restricted to slots subsequent to the next slot of the corresponding PDCCH.

Therefore, the present inventors have conceived an operation in which UE configured with cross-carrier scheduling determines information about a QCL.

Hereinafter, embodiments according to the present disclosure will be described in detail with reference to the drawings. Radio communication methods according to the respective embodiments may be applied independently, or may be applied in combination.

The TCI state may be replaced with a TCI state or a QCL assumption, a QCL assumption, a spatial domain reception filter, a UE spatial domain reception filter, a spatial domain filter, a UE reception beam, a DL reception beam, a DL-RS, or the like. RS in the TCI state related to the QCL type D parameter, RS of QCL type D, DL-RS associated with QCL type D, DL-RS with QCL type D, a source of the DL-RS, SSB, and CSI-RS may be replaced with each other. The QCL parameter and the QCL type parameter may be replaced with each other.

In the present disclosure, the expression that A has a QCL with B and the expression that A is quasi-co-located (in QCL) with B may be replaced with each other. RS in the TCI state related to QCL parameter(s) used for the PDCCH QCL indication may be replaced with RS in the TCI state used for the PDCCH QCL indication, RS in the TCI state for the PDCCH, or the like.

In the present disclosure, assuming, expecting, and considering may be replaced with each other.

(Radio Communication Method)

Embodiment 1

At least one of a state where TCI field information (tci-PresentInDCi) is set to be enabled and a state where a scheduling offset is equal to or greater than a scheduling threshold value may be applied only when a scheduling cell is different from a scheduled cell.

The scheduling cell may be replaced with a scheduling CC, a PDCCH cell, a scheduling PDCCH cell, a first cell, or the like. The scheduled cell may be replaced with a scheduled CC, a PDSCH cell, a scheduled PDSCH cell, a second cell, or the like.

Figure 2:
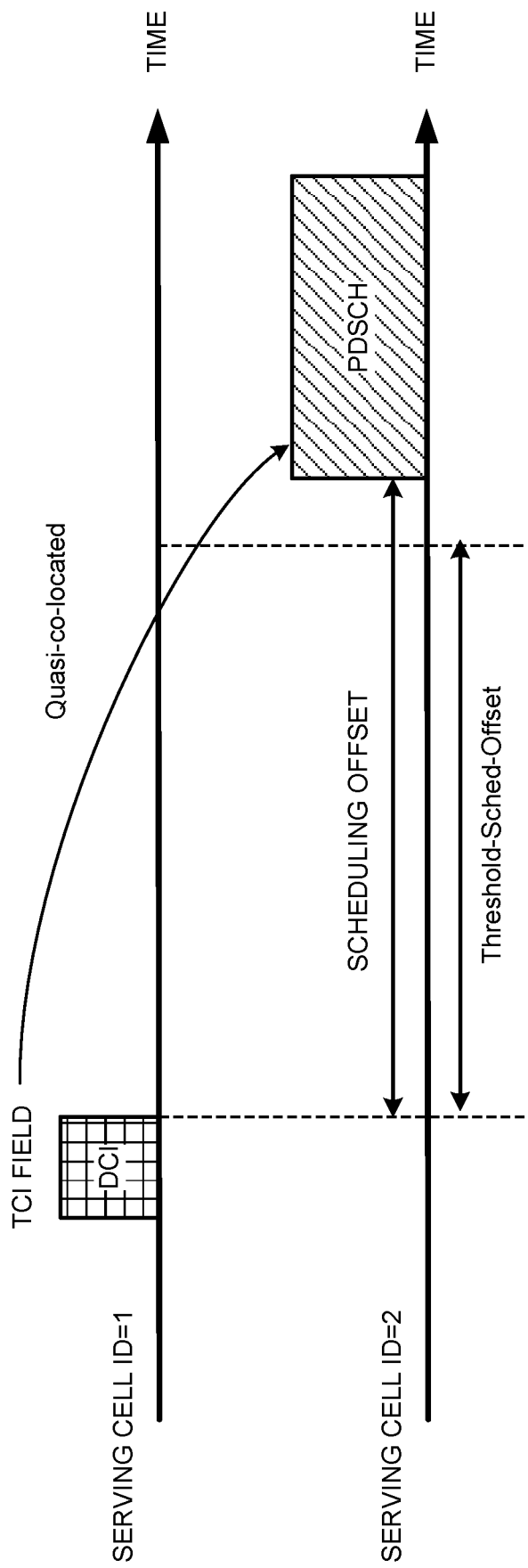
FIG. 2 is a diagram illustrating an example of a QCL assumption of a DMRS port of PDSCH in a case where a scheduled cell is different from a scheduling cell.

For example, as illustrated in FIG. 2, when UE is configured with CORESET associated with a search space set for cross-carrier scheduling and the scheduling cell is different from the scheduled cell (a serving cell ID of the scheduling PDCCH is different from a serving cell ID of the scheduled PDSCH), the UE may assume that the TCI field information is set to be enabled for the CORESET. In this case, when one or more TCI states configured for the serving cell scheduled by a search space set include information ('QCL-TypeD') indicating a QCL type D parameter, the UE may assume that the scheduling offset is equal to or greater than the scheduling threshold value.

The UE being configured with the CORESET associated with the search space set for cross-carrier scheduling may be replaced with the UE monitoring PDCCH for cross-carrier scheduling, the UE being configured with cross-carrier scheduling, the UE being configured with cross-carrier scheduling configuration information (CrossCarrierSchedulingConfig), the UE being configured with CIF by higher layer signaling, the UE monitoring DCI (DCI format 1_1) including the CIF, or the like.

The state where the scheduled cell is different from the scheduling cell may be replaced with a state where the serving cell ID (index) of the scheduled PDSCH is different from the serving cell ID of the scheduling PDCCH, a state where the serving cell ID of the scheduled cell is different from the serving cell ID of the scheduling cell, a state where cross-carrier scheduling configuration information for the scheduled cell indicates that the scheduling cell is other serving cells, a state where a CIF value in the DCI format 1_1 for scheduling PDSCH is one or more (not zero), or the like.

When the UE is configured with the CORESET associated with the search space set for cross-carrier scheduling and the scheduling cell is the same as the schedule cell, at least one of the state where the TCI field information is set to be enabled and the state where the scheduling offset is equal to or greater than the scheduling threshold value is not necessarily applied.

The state where the scheduled cell is the same as the scheduling cell may be replaced with a state where the serving cell ID of the scheduled PDSCH is the same as the serving cell ID of the scheduling PDCCH, a state where the serving cell ID of the scheduled cell is the same as the serving cell ID of the scheduling cell, a state where cross-carrier scheduling configuration information for the scheduled cell indicates that the scheduling cell is the own serving cell, a state where a CIF value in the DCI format 1_1 for scheduling PDSCH is zero, a state where PDSCH is scheduled according to DCI format 1_0 (not including CIF), or the like.

The UE may operate according to at least one of the following Embodiments 1-1, 1-2, and 1-3.

Embodiment 1-1

When UE is configured with CORESET associated with a search space set for cross-carrier scheduling and a scheduling cell is the same as a scheduled cell, the UE may operate similarly to a case where the cross-carrier scheduling is not configured.

Figure 3:
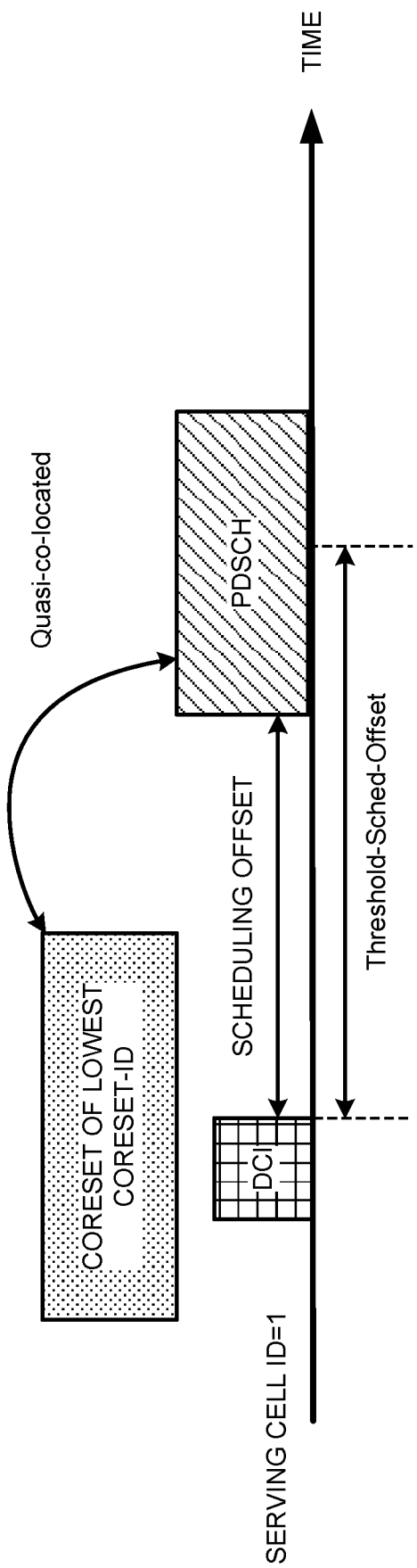
FIG. 3 is a diagram illustrating an example of a QCL assumption of a DMRS port of PDSCH in a case where a scheduled cell is the same as a scheduling cell.

For example, as illustrated in FIG. 3, when the scheduling offset is smaller than the scheduling offset threshold value and a serving cell index of a scheduling PDCCH is the same as a serving cell index of a scheduled PDCCH in both of a case where TCI field information is set to be enabled and a case where the TCI field information is not set in RRC, the UE may assume that a DMRS port of PDSCH of the serving cell has the lowest CORESET-ID in the latest slot in which one or more CORESETs in an active BWP of the serving cell are monitored by the UE and is in QCL with RS in a TCI state related to a QCL parameter used for QCL indication of PDCCH of CORESET (specific CORESET) associated with a search space to be monitored.

According to Embodiment 1-1 described above, when the PDSCH of the same cell is scheduled by the PDCCH for cross-carrier scheduling, scheduling of the PDSCH whose scheduling offset is less than the scheduling threshold value can be performed since the scheduling offset is not limited. Thus, it is possible to perform scheduling flexibly and to improve the frequency utilization efficiency.

Embodiment 1-2

An operation of UE in a case where UE is configured with CORESET associated with a search space set for cross-carrier scheduling and a scheduled cell is the same as a scheduling cell or the scheduled cell is a different cell in the same band as the scheduling cell may be similar to an operation in a case where the cross-carrier scheduling is not configured.

In this case, the UE may assume that a DMRS port of PDSCH (scheduled PDSCH) of a serving cell is in QCL with RS in a TCI state for a QCL type D (or at least QCL type D) parameter used for QCL indication of PDCCH of a specific CORESET.

When the scheduled cell is a different cell in the same band as the scheduling cell, the UE does not necessarily assume that the DMRS port of the scheduled PDSCH is in QCL with RS of a TCI state for PDCCH of a specific CORESET for QCL Type A (RS of QCL Type A of the scheduled PDSCH is the same as RS of QCL Type A for PDCCH of the specific CORESET), and may assume that the DMRS port of the scheduled PDSCH is in QCL with RS of a TCI state for PDCCH of a specific CORESET for a QCL type D parameter (RS of QCL type D of the scheduled PDSCH is the same as RS of QCL type D for PDCCH of the specific CORESET).

When the scheduled cell is a different cell in the same band as the scheduling cell, the UE may use one of the following QCL Type A Assumptions 1 to 3.

<<QCL Type A Assumption 1>>

When UE receives at least one DL-RS of TRS, CSI-RS, and SSB in a scheduled cell, the UE may assume that a DMRS port of PDSCH of the scheduled cell is in QCL with the received DL-RS for a QCL type A parameter. Note that there is a case where the DMRS port of PDSCH of the scheduled cell is not in QCL with the received DL-RS for a QCL type D parameter. According to QCL type A Assumption 1, a load of the UE can be suppressed as compared with QCL type A Assumption 2.

<<QCL Type A Assumption 2>>

When UE receives at least one DL-RS of TRS, CSI-RS, and SSB in a scheduled cell and the received DL-RS has RS in QCL with a DMRS port of PDSCH of the scheduled cell for a QCL type D parameter, the UE may assume that the DMRS port of PDSCH of the scheduled cell is in QCL with the RS for a QCL type A parameter. Since the RS is in QCL with the DMRS port of PDSCH of the scheduled cell for both the QCL type A parameter and the QCL type D parameter, the channel estimation accuracy of the PDSCH can be improved in some cases as compared with QCL type A assumption 1.

<<QCL Type A Assumption 3>>

UE does not necessarily assume that RS in QCL with a DMRS port of PDSCH of a scheduled cell is configured for a QCL type A parameter. According to QCL type A Assumption 3, a load of the UE can be suppressed as compared with QCL type A Assumptions 1 and 2.

The UE may assume that all cells in a band use the same beam in intra-band CA (DMRS ports of PDSCHs in all the cells are in QCL for a QCL type D parameter). The UE may assume that DMRS ports of scheduled PDSCHs in all the CCs are in QCL with a scheduling PDCCH for the QCL type D parameter. Therefore, when a scheduled cell configured with cross-carrier scheduling is the same as a scheduling cell or the scheduled cell configured with cross-carrier scheduling is a different cell in the same band as the scheduling cell, the UE may apply a TCI state of the scheduling PDCCH (at least RS of QCL type D) to the scheduled PDSCH.

According to Embodiment 1-2 described above, when the scheduled cell is the same as the scheduling cell or the scheduled cell is a different cell in the same band as the scheduling cell, scheduling of the PDSCH whose scheduling offset is less than the scheduling threshold value can be performed since the scheduling offset is not limited. Thus, it is possible to perform scheduling flexibly and to improve the frequency utilization efficiency.

Embodiment 1-3

An operation of UE in a case where the UE is configured with CORESET associated with a search space set for cross-carrier scheduling and a scheduled cell is the same as a scheduling cell may be similar to an operation in a case where the cross-carrier scheduling is not configured.

In this case, the UE may assume that a DMRS port of PDSCH (scheduled PDSCH) of a serving cell is in QCL with RS in a ICI state for a QCL type D (or at least QCL type D) parameter used for QCL indication of PDCCH for which the PDSCH has been scheduled.

In this case, the scheduled PDSCH may be received by the same reception beam as the scheduling PDCCH (a DMRS port of the scheduled PDSCH may be in QCL with the scheduling PDCCH for a QCL type D parameter). The communication quality can be improved as compared with a case of using a ICI state of PDCCH of a specific CORESET.

(Radio Communication System)

Hereinafter, a configuration of a radio communication system according to one embodiment of the present disclosure will be described. In this radio communication system, communication is performed using any one or a combination of the radio communication methods according to the above-mentioned respective embodiments of the present disclosure.

Figure 4:
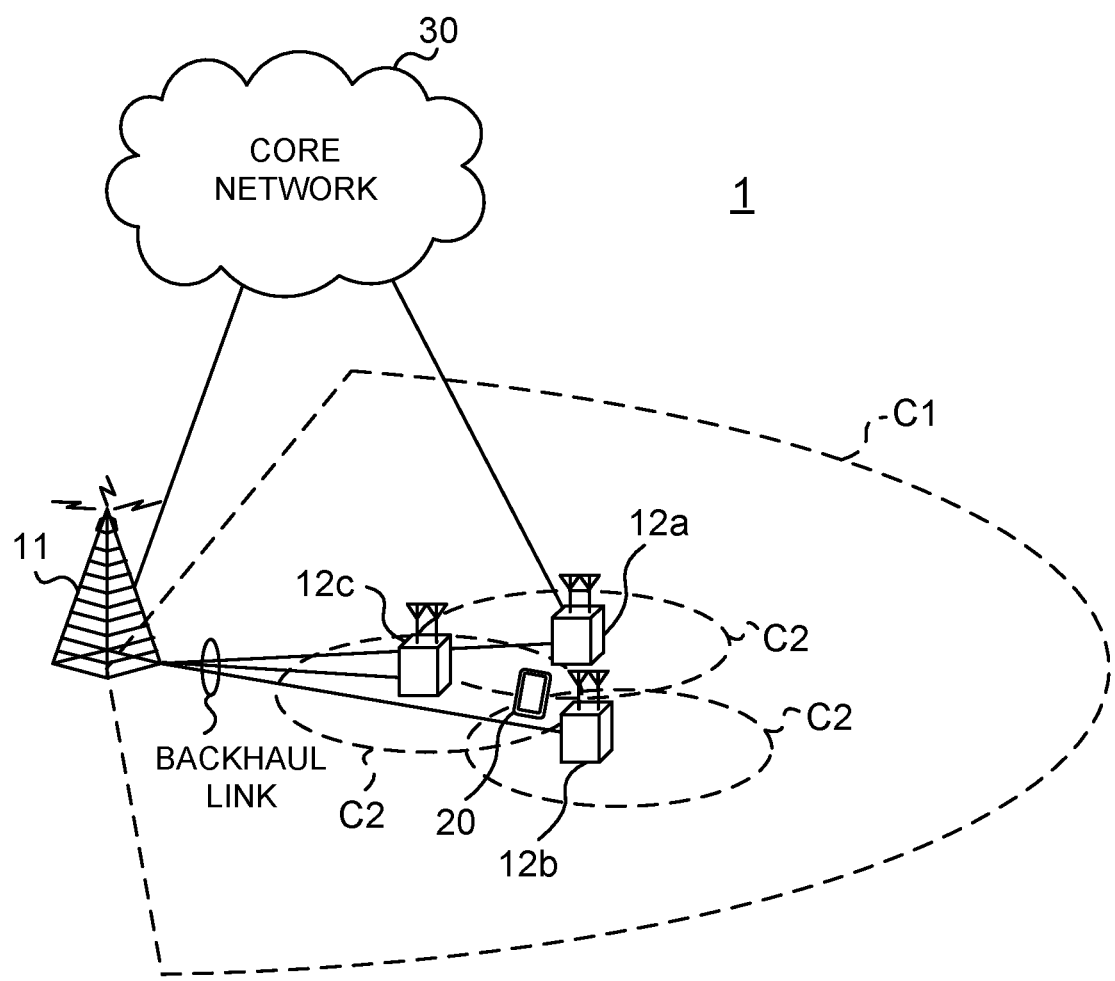
FIG. 4 is a diagram illustrating an example of a schematic configuration of a radio communication system according to one embodiment.

FIG. 4 illustrates one example of a schematic configuration of the radio communication system according to one embodiment. A radio communication system 1 may be a system that implements communication using long term evolution (LTE), 5th generation mobile communication system new radio (5G NR), and the like specified by third generation partnership project (3GPP).

Further, the radio communication system 1 may support dual connectivity (multi-RAT dual connectivity (MR-DC)) between a plurality of radio access technologies (RATs). MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in the same RAT (e.g., dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) and dual connectivity (DC) using a plurality of component carriers (CC).

Each CC may be included in at least one of a first frequency band (Frequency Range 1 (FR1)) and a second frequency band (Frequency Range 2 (FR2)). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

Further, the user terminal 20 may perform communication in each CC using at least one of time division duplex (TDD) and frequency division duplex (FDD).

The plurality of base stations 10 may be connected by wire (e.g., an optical fiber or an X2 interface in compliance with common public radio interface (CPRI)) or by radio (e.g., NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include at least one of, for example, an evolved packet core (EPC), a 5G core network (5GCN), a next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that another radio access method (e.g., another single carrier transmission method or another multi-carrier transmission method) may be used as the UL and DL radio access method in the radio communication system 1.

In the radio communication system 1, a physical downlink shared channel (PDSCH) shared by the respective user terminals 20, a physical broadcast channel (PBCH), a physical downlink control channel (PDCCH), and the like may be used as downlink channels.

Further, a physical uplink shared channel (PUSCH) shared by the respective user terminals 20, a physical uplink control channel (PUCCH), a physical random access channel (PRACH), and the like may be used as uplink channels in the radio communication system 1.

User data, higher layer control information, a system information block (SIB) are transmitted by PDSCH. PUSCH may transmit user data, higher layer control information, and the like. Further, the PBCH may transmit a master information block (MIB).

PDCCH may transmit lower layer control information. The lower layer control information may include, for example, downlink control information (DCI) including scheduling information of at least one of PDSCH and PUSCH.

Note that DCI that schedules PDSCH may be referred to as DL assignment, DL DCI, or the like, and DCI scheduling PUSCH may be referred to as UL grant, UL DCI, or the like. Note that PDSCH may be replaced with DL data, and PUSCH may be replaced with UL data.

A control resource set (CORESET) and a search space may be used to detect PDCCH. CORESET corresponds to a resource that searches for DCI. The search space corresponds to a search area and a search method for PDCCH candidates. One CORESET may be associated with one or more search spaces. UE may monitor CORESET associated with a certain search space based on search space configuration.

One search space may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (e.g., hybrid automatic repeat request acknowledgement (HARQ-ACK), which may be referred to as ACK/NACK or the like), and a scheduling request (SR) may be transmitted by PUCCH. By means of PRACH, a random access preamble for establishing a connection with a cell may be transmitted.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be at least one of, for example, a primary synchronization signal (PSS) and a secondary synchronization signal (SSS). A signal block including SS (PSS or SSS) and PBCH (and DMRS for PBCH) may be referred to as an SS/PBCH block, an SS Block (SSB), and the like. Note that SS, SSB, or the like may also be referred to as a reference signal.

Further, a sounding reference signal (SRS), a demodulation reference signal (DMRS), or the like may be transmitted as an uplink reference signal (UL-RS) in the radio communication system 1. Note that DMRS may be referred to as a "user terminal-specific reference signal (UE-specific reference signal)".

(Base Station)

Figure 5:
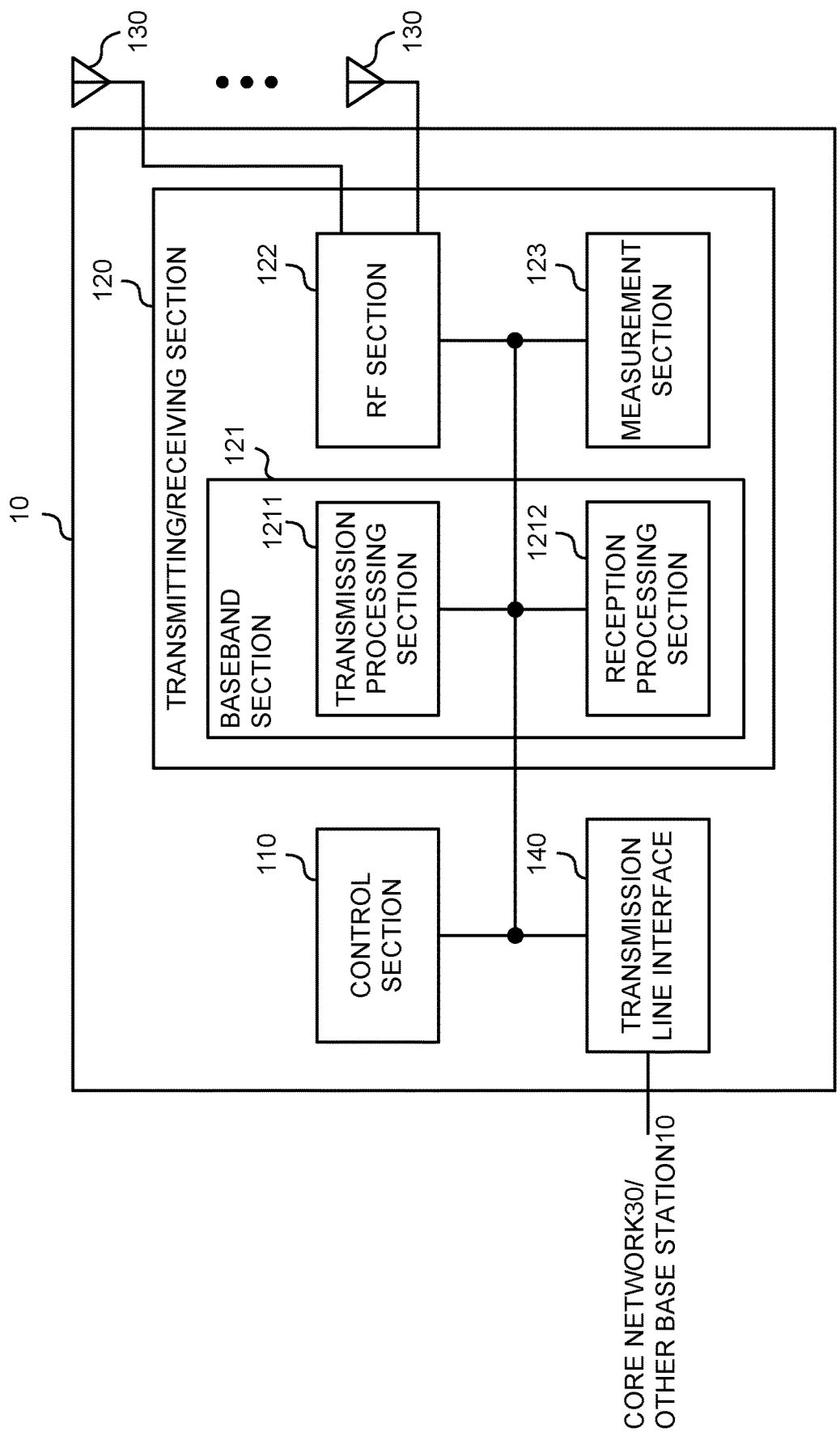
FIG. 5 is a diagram illustrating an example of a configuration of a base station according to one embodiment.

FIG. 5 is a diagram illustrating an example of a configuration of the base station according to one embodiment. The base station 10 includes a control section 110, a transmission/reception section 120, a transmission/reception antenna 130, and a transmission line interface 140. Note that one or more of the control sections 110, one or more of the transmission/reception sections 120, one or more of the transmission/reception antennas 130, and one or more of the transmission line interfaces 140 may be included.

Note that this example mainly describes functional blocks of characteristic parts in the present embodiment, and it may be assumed that the base station 10 also includes other functional blocks necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (e.g., resource allocation or mapping), and the like. The control section 110 may control transmission/reception, measurement, and the like using the transmission/reception section 120, the transmission/reception antenna 130, and the transmission line interface 140. The control section 110 may generate data to be transferred as a signal, control information, a sequence, and the like, and may transfer the data, the control information, the sequence, and the like to the transmission/reception section 120. The control section 110 may perform call processing (such as configuration or releasing) of a communication channel, management of the state of the base station 10, and management of a radio resource.

The transmission/reception section 120 may include a base band section 121, a radio frequency (RF) section 122, and a measurement section 123. The base band section 121 may include a transmission processing section 1211 and a reception processing section 1212. The transmission/reception section 120 can be constituted by a transmitter/receiver, an RF circuit, a base band circuit, a filter, a phase shifter, a measurement circuit, a transmission/reception circuit, and the like, which are described based on common recognition in the technical field to which the present disclosure relates.

The transmission/reception section 120 may be constituted as an integrated transmission/reception section, or may be constituted by a transmission section and a reception section. The transmission section may be constituted by the transmission processing section 1211 and the RF section 122. The reception section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a Tx beam and a reception beam using digital beam forming (e.g., precoding), analog beam forming (e.g., phase rotation), and the like.

The transmission/reception section 120 (transmission processing section 1211) may perform packet data convergence protocol (PDCP) layer processing, radio link control (RLC) layer processing (e.g., RLC retransmission control), medium access control (MAC) layer processing (e.g., HARQ retransmission control), and the like on data, control information, and the like acquired from the control section 110 to generate a bit string to be transmitted.

The transmission/reception section 120 (transmission processing section 1211) may perform transmission processing such as channel coding (which may include error correction coding), modulation, mapping, filtering processing, discrete Fourier transform (DFT) processing (if necessary), inverse fast Fourier transform (IFFT) processing, precoding, and digital-analog transform on the bit string to be transmitted, and may output a base band signal.

The transmission/reception section 120 (RF section 122) may perform modulation to a radio frequency band, filtering processing, amplification, and the like on the base band signal, and may transmit a signal in the radio frequency band via the transmission/reception antenna 130.

Meanwhile, the transmission/reception section 120 (RF section 122) may perform amplification, filtering processing, demodulation to a base band signal, and the like on the signal in the radio frequency band received by the transmission/reception antenna 130.

The transmission/reception section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, and PDCP layer processing on the acquired base band signal to acquire user data and the like.

The transmission/reception section 120 (measurement section 123) may perform measurement on the received signal. For example, the measurement section 123 may perform radio resource management (RRM) measurement, channel state information (CSI) measurement, and the like based on the received signal. The measurement section 123 may measure received power (e.g., reference signal received power (RSRP)), received quality (e.g., reference signal received quality (RSRQ), a signal to interference plus noise ratio (SINR), or a signal to noise ratio (SNR)), signal strength (e.g., received signal strength indicator (RSSI)), propagation path information (e.g., CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the reception section of the base station 10 in the present disclosure may be constituted by at least one of the transmission/reception section 120, the transmission/reception antenna 130, and the transmission line interface 140.

Further, the transmission/reception section 120 may transmit a reference signal (e.g., DL-RS, SSB, CSI-RS, TRS, PDCCH DMRS, PDSCH DMRS, and the like).

The transmission/reception section 120 may transmit a first downlink control channel (PDCCH) for cross-carrier scheduling in a first cell (scheduling cell). A downlink shared channel (PDSCH) of a second cell (scheduled cell) may be scheduled by downlink control information (DCI) in the first downlink control channel. When the second cell is different from the first cell, the control section 110 may set TCI field information (e.g., tci-PresentInDCi), which indicates whether a transmission configuration indication (TCI) field is present or absent in the downlink control information, to be enabled.

(User Terminal)

Figure 6:
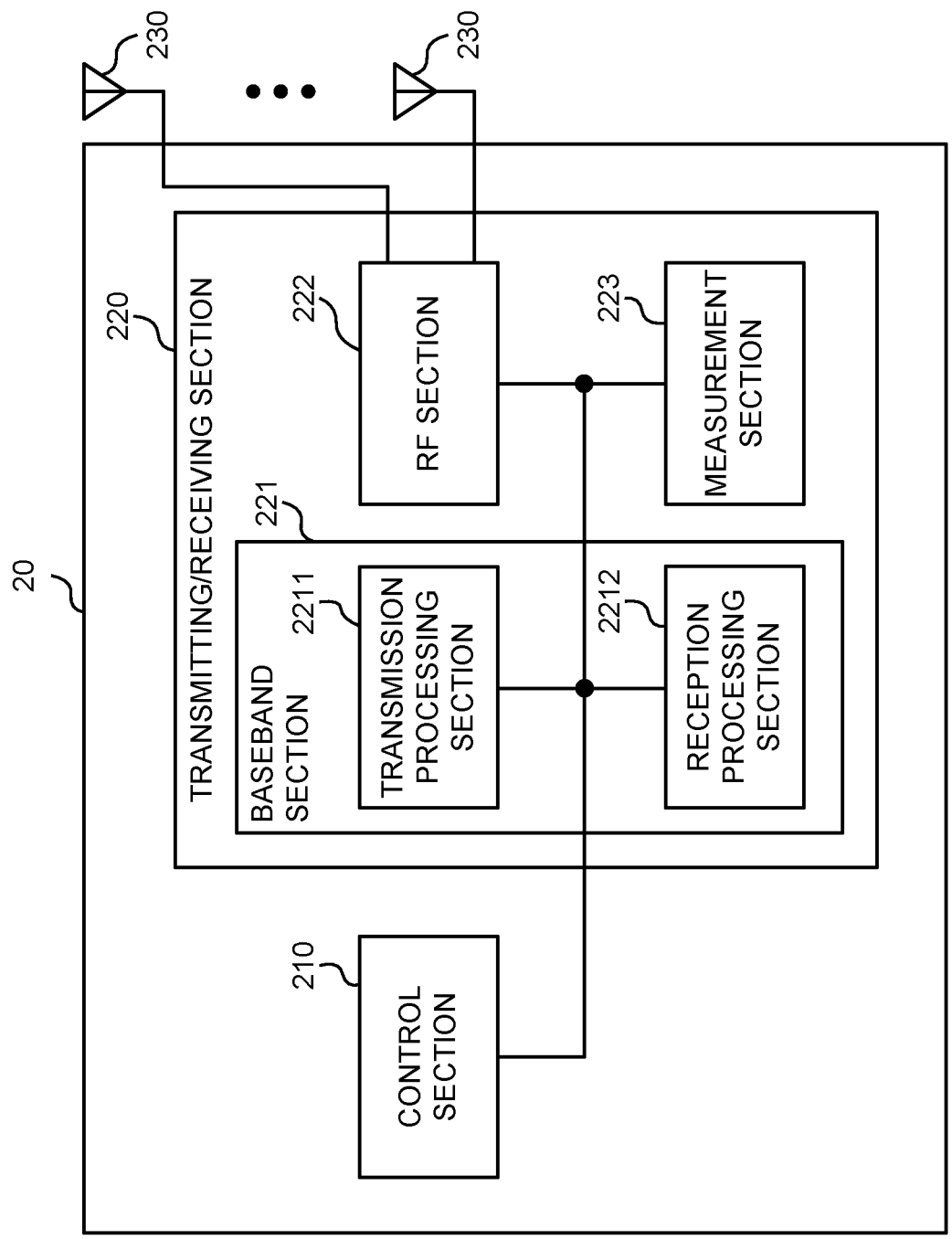
FIG. 6 is a diagram illustrating an example of a configuration of a user terminal according to one embodiment.

FIG. 6 is a diagram illustrating an example of a configuration of the user terminal according to one embodiment. The user terminal 20 includes a control section 210, a transmission/reception section 220, and a transmission/reception antenna 230. Note that one or more of the control sections 210, one or more of the transmission/reception sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmission/reception section 220 and the transmission/reception antenna 230. The control section 210 may generate data to be transferred as a signal, control information, a sequence, and the like, and may transfer the data, the control information, the sequence, and the like to the transmission/reception section 220.

The transmission/reception section 220 may include a base band section 221, an RF section 222, and a measurement section 223. The base band section 221 may include a transmission processing section 2211 and a reception processing section 2212. The transmission/reception section 220 can be constituted by a transmitter/receiver, an RF circuit, a base band circuit, a filter, a phase shifter, a measurement circuit, a transmission/reception circuit, and the like, which are described based on common recognition in the technical field to which the present disclosure relates.

The transmission/reception section 220 may be constituted as an integrated transmission/reception section, or may be constituted by a transmission section and a reception section. The transmission section may be constituted by the transmission processing section 2211 and the RF section 222. The reception section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a Tx beam and a reception beam using digital beam forming (e.g., precoding), analog beam forming (e.g., phase rotation), and the like.

The transmission/reception section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmission/reception section 220 (transmission processing section 2211) may perform transmission processing such as channel coding (which may include error correction coding), modulation, mapping, filtering processing, DFT processing (if necessary), IFFT processing, precoding, or digital-analog transform on a bit string to be transmitted, and may output a base band signal.

Note that whether or not to apply DFT processing may be determined based on configuration of transform precoding. When transform precoding is enabled for a channel (for example, PUSCH), the transmission/reception section 220 (transmission processing section 2211) may perform DFT processing as the above-mentioned transmission processing in order to transmit the channel using a DFT-s-OFDM waveform. The DFT processing is not necessarily performed as the above-mentioned transmission processing when transform precoding is not enabled for a channel (for example, PUSCH).

The transmission/reception section 220 (RF section 222) may perform modulation to a radio frequency band, filtering processing, amplification, and the like on the base band signal, and may transmit a signal in the radio frequency band via the transmission/reception antenna 230.

Meanwhile, the transmission/reception section 220 (RF section 222) may perform amplification, filtering processing, demodulation to a base band signal, and the like on the signal in the radio frequency band received by the transmission/reception antenna 230.

The transmission/reception section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired base band signal.

The transmission/reception section 220 (measurement section 223) may perform measurement on the received signal. For example, the measurement section 223 may perform RRM measurement, CSI measurement, and the like based on the received signal. The measurement section 223 may measure received power (e.g., RSRP), received quality (e.g., RSRQ, SINR, or SNR), signal strength (e.g., RSSI), propagation path information (e.g., CSI), and the like. The measurement result may be output to the control section 210.

Note that the transmission section and the reception section of the user terminal 20 in the present disclosure may include at least one of the transmission/reception section 220 and the transmission/reception antenna 230.

Further, the transmission/reception section 220 may receive a reference signal (e.g., DL-RS, SSB, CSI-RS, TRS, PDCCH DMRS, PDSCH DMRS, and the like).

The transmission/reception section 220 may monitor the first downlink control channel (PDCCH) for cross-carrier scheduling in the first cell (scheduling cell). A downlink shared channel (PDSCH) of a second cell (scheduled cell) may be scheduled by downlink control information (DCI) in the first downlink control channel. When the second cell is different from the first cell, the control section 210 may assume that TCI field information (e.g., tci-PresentInDCi), which indicates whether a transmission configuration indication (TCI) field is present or absent in the downlink control information, is set to be enabled.

When the second cell is different from the first cell and one or more TCI states related to the first downlink control channel include information (e.g., 'QCL-TypeD') of a quasi-co-location (QCL) type D parameter, the control section 210 may assume that an offset (e.g., the scheduling offset) between reception of the first downlink control channel and the downlink shared channel is equal to or greater than an offset threshold value (e.g., the scheduling offset threshold value).

When the second cell is the same as the first cell, the control section 210 may assume that a demodulation reference signal (DMRS) port of the downlink shared channel is quasi-co-located with a reference signal (RS) in a TCI state used for a downlink control channel quasi-co-location (QCL) indication of a specific control resource set (specific CORESET) of the first cell.

For example, the specific CORESET may be a CORESET that has the lowest CORESET-ID in the latest slot in which one or more CORESETs in active BWPs of the serving cell (the first cell) are monitored by the UE (the user terminal 20) and is associated with a search space to be monitored.

When the second cell is the same as the first cell or is a different cell in the same band (e.g., inter-band CA), the control section 210 may assume that a demodulation reference signal port of the downlink shared channel is quasi-co-located with a reference signal in a TCI state related to a QCL type D parameter used for a downlink control channel quasi-co-location (QCL) indication of a specific control resource set of the first cell.

When the second cell is the same as the first cell, the control section 210 may assume that a demodulation reference signal port of the downlink shared channel is quasi-co-located with a reference signal in a TCI state used for a quasi-co-location (QCL) indication of the downlink control channel.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be achieved by a single device physically or logically aggregated, or may be achieved by directly or indirectly connecting two or more physically or logically separate devices (using wires, radio, or the like, for example) and using these plural devices. The functional block may be achieved by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like. For example, a functional block (configuration unit) that causes transmission to function may be referred to as a transmitting unit, a transmitter, and the like. In any case, as described above, the implementation method is not particularly limited.

Figure 7:
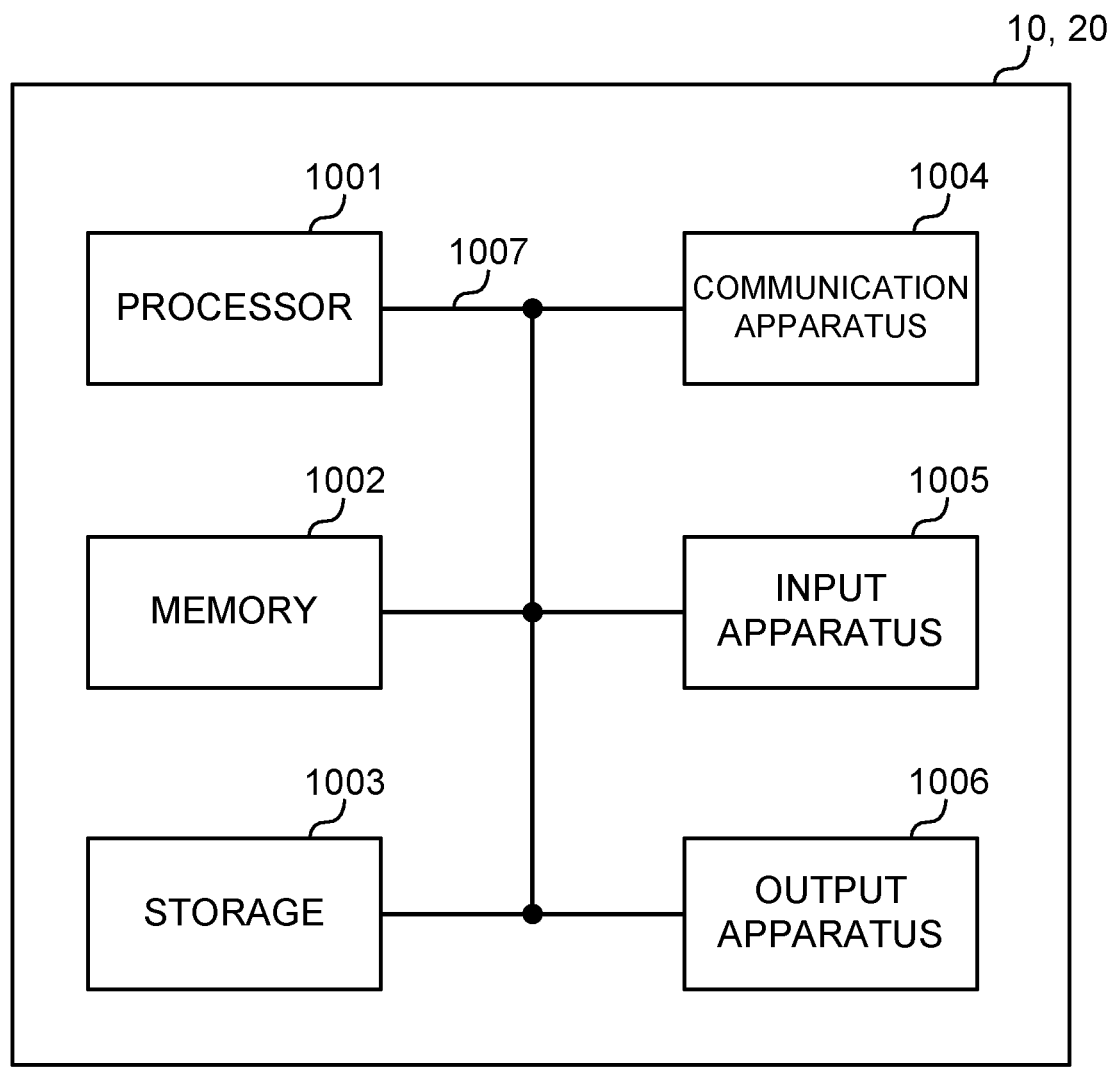
FIG. 7 is a diagram illustrating an example of a hardware configuration of a base station and a user terminal according to one embodiment.

For example, the base station, the user terminal, and the like according to one embodiment of the present disclosure may function as a computer that executes the processing of the radio communication method of the present disclosure. FIG. 7 is a diagram illustrating an exemplary hardware configuration of a base station and a user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, an apparatus, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be provided. Further, the processing may be executed by one processor, or the processing may be executed in sequence or using other different methods simultaneously by two or more processors. Note that the processor 1001 may be implemented with one or more chips.

Each function of the base station 10 and the user terminal 20 is implemented by, for example, reading given software (program) into hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. As the processor 1001, provided may be a central processing unit (CPU) including an interface with peripheral equipment, a control device, an operation device, a register, and the like. For example, at least a part of the above-described control section 110 (210), transmission/reception section 120 (220), and the like may be implemented by the processor 1001.

Further, the processor 1001 reads programs (program codes), software modules, data, and the like from at least one of the storage 1003 or the communication apparatus 1004 into the memory 1002, and executes various types of processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include at least one of, for example, a read only memory (ROM), an erasable programmable rom (EPROM), an electrically EPROM (EEPROM), a random access memory (RAM), and other appropriate storage media. The memory 1002 may be referred to as a "register", a "cache", a "main memory (primary storage apparatus)", and the like. The memory 1002 can store a program (program code), a software module, and the like, which are executable for implementing the radio communication method according to one embodiment of the present disclosure.

The storage 1003 is a computer-readable recording medium, and may include at least one of, for example, a flexible disk, a floppy (registered trademark) disk, a magneto-optical disk (e.g., compact disc (compact disc ROM (CD-ROM) and the like), digital versatile disc, Blu-ray (registered trademark) disk), a removable disk, a hard disk drive, a smart card, a flash memory device (e.g., card, stick, and key drive), a magnetic stripe, a database, a server, and other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement at least one of, for example, frequency division duplex (FDD) and time division duplex (TDD). For example, the transmission/reception section 120 (220), the transmission/reception antenna 130 (230), and the like described above may be implemented by the communication apparatus 1004. The transmission/reception section 120 (220) may be implemented by physically or logically separating a transmission section 120*a* (220*a*) and a reception section 120*b* (220*b*) from each other.

The input apparatus 1005 is an input device that receives an input from outside (e.g., a keyboard, a mouse, a microphone, a switch, a button, a sensor, and the like). The output apparatus 1006 is an output device that performs output to the outside (e.g., a display, a speaker, a light emitting diode (LED) lamp, and the like). Note that the input apparatus 1005 and the output apparatus 1006 may be provided in an integrated structure (e.g., a touch panel).

Further, the respective apparatuses, such as the processor 1001 and the memory 1002, are connected by the bus 1007 to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), and a field programmable gate array (FPGA), and some or all of the functional blocks may be implemented using the hardware. For example, the processor 1001 may be implemented with at least one of these pieces of hardware.

Modification

Note that terms described in the present disclosure and terms necessary for understanding the present disclosure may be replaced with other terms that have the same or similar meanings. For example, a channel, a symbol, and a signal (signal or signaling) may be read interchangeably. Further, the signal may be a message. A reference signal can be abbreviated as an "RS", and may be referred to as a "pilot", a "pilot signal", and the like, depending on which standard applies. Further, a "component carrier (CC)" may be referred to as a "cell", a "frequency carrier", a "carrier frequency", and the like.

A radio frame may include one or a plurality of durations (frames) in the time domain. Each of the one or plurality of periods (frames) constituting the radio frame may be referred to as a "subframe". Furthermore, a subframe may include one or a plurality of slots in the time domain. A subframe may be a fixed time duration (e.g., 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (e.g., orthogonal frequency division multiplexing (OFDM) symbol and single carrier frequency division multiple access (SC-FDMA) symbol) in the time domain. Further, the slot may be a time unit based on numerology.

The slot may include a plurality of mini slots. Each mini slot may include one or a plurality of symbols in the time domain. Further, the mini slot may be referred to as a "subslot". Each mini slot may include fewer symbols than a slot. PDSCH (or PUSCH) transmitted in a time unit larger than a mini slot may be referred to as PDSCH (PUSCH) mapping type A. PDSCH (or PUSCH) transmitted using the mini slot may be referred to as PDSCH (PUSCH) mapping type B.

All the radio frame, the subframe, the slot, the mini slot and the symbol represent the time units at the time of transmitting a signal. The radio frame, the subframe, the slot, the mini slot, and the symbol may be called by other applicable names, respectively. Note that the time units such as the frame, the subframe, the slot, the mini slot, and the symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (e.g., one to thirteen symbols), or may be a period longer than 1 ms. Note that a unit that represents TTI may be referred to as a slot, a mini slot, and the like, instead of the subframe.

Here, TTI refers to the minimum time unit of scheduling in radio communication, for example. For example, in the LTE system, a base station performs scheduling to allocate radio resources (a frequency bandwidth and transmission power that can be used in each user terminal and the like) to each user terminal in TTI units. Note that the definition of TTI is not limited thereto.

TTI may be a transmission time unit of a channel-encoded data packet (transport block), a code block, a codeword, and the like, or may be a processing unit of scheduling, link adaptation, and the like. Note that, when TTI is given, a time interval (e.g., the number of symbols) in which the transport block, the code block, the codeword, and the like are actually mapped may be shorter than the TTI.

Note that, when one slot or one mini slot is referred to as a "TTI", one or more TTIs (that is, one or more slots or one or more mini slots) may be the minimum time unit of scheduling. Further, the number of slots (the number of mini slots) constituting this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. TTI shorter than the usual TTI may be referred to as shortened TTI, short TTI, partial TTI (or fractional TTI), a shortened subframe, a short subframe, a mini slot, a subslot, a slot, and the like.

Note that long TTI (e.g., normal TTI or a subframe) may be replaced with TTI having a time length exceeding 1 ms, and short TTI (for example, shortened TTI) may be replaced with TTI having a TTI duration less than the TTI duration of long TTI and equal to or more than 1 ms.

A resource block (RB) is a resource allocation unit in the time domain and the frequency domain, and may include one or a plurality of consecutive subcarriers in the frequency domain. The number of subcarriers included in the RB may be the same regardless of the numerology, and may be twelve, for example. The number of subcarriers included in the RB may be determined based on the numerology.

Further, RB may include one or a plurality of symbols in the time domain, and may have a length of one slot, one mini slot, one subframe, or one TTI. One TTI, one subframe, and the like may each include one or a plurality of resource blocks.

Note that one or a plurality of RBs may be referred to as a physical resource block (Physical RB (PRB)), a subcarrier group (SCG), a resource element group (REG), a PRB pair, an RB pair, and the like.

Further, a resource block may include one or a plurality of resource elements (REs). For example, one RE may be a radio resource field of one subcarrier and one symbol.

The bandwidth part (BWP) (which may be called partial bandwidth and the like) may represent a subset of consecutive common resource blocks (RB) for certain numerology in a certain carrier. Here, the common RB may be specified by the index of the RB based on a common reference point of the carrier. The PRB may be defined in a BWP and numbered within the BWP.

BWP may include BWP for UL (UL BWP) and BWP for DL (DL BWP). One or a plurality of BWPs may be set within one carrier for UE.

At least one of the configured BWPs may be active, and the UE does not necessarily assume to transmit or receive a given signal/channel outside the active BWP. Note that "cell", "carrier", and the like in the present disclosure may be replaced with "BWP".

Note that the structures of the above-mentioned radio frame, subframe, slot, mini slot, symbol, and the like are merely examples. For example, configurations of the number of subframes in a radio frame, the number of slots per subframe or radio frame, the number of mini slots in a slot, the number of symbols and RBs in a slot or a mini slot, the number of subcarriers in RB, the number of symbols in TTI, a symbol length, a cyclic prefix (CP) length, and the like can be variously changed.

Further, the information, parameters, and the like described in the present disclosure may be represented using absolute values or relative values with respect to given values, or may be represented using other corresponding information. For example, the radio resource may be indicated by a given index.

The names used for the parameters and the like in the present disclosure are not limited names in any respect. Furthermore, any mathematical expression or the like that uses these parameters may differ from those explicitly disclosed in the present disclosure. Since various channels (e.g., PUCCH and PDCCH) and information elements can be identified by any suitable name, various names allocated to these various channels and information elements are not limited names in any respect.

The information, signals, and the like described in the present disclosure may be represented by using a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or an arbitrary combination thereof.

Further, information, a signal, and the like can be output in at least one of a direction from a higher layer to a lower layer and a direction from a lower layer to a higher layer. Information, a signal, and the like may be input/output via a plurality of network nodes.

The input and/or output information, signal, and the like can be stored in a specific location (for example, a memory) or can be managed using a management table. The information, signal, and the like to be input and/or output can be overwritten, updated or appended. The output information, signal, and the like may be deleted. The input information, signal, and the like may be transmitted to another apparatus.

Notification of information may be performed using not only the aspects/embodiments described in the present disclosure but also another method. For example, the notification of information in the present disclosure may be performed using physical layer signaling (e.g., downlink control information (DCI), uplink control information (UCI), higher layer signaling (e.g., radio resource control (RRC) signaling, broadcast information (master information block (MIB), system information block (SIB), or the like), medium access control (MAC) signaling, another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of MAC signaling may be performed using, for example, a MAC control element (MAC CE).

Further, notification of given information (e.g., notification of "being X") is not limited to explicit notification but may be performed implicitly (for example, by not performing notification of the given information or by performing notification of another piece of information).

A determination may be made in a value represented by one bit (0 or 1), may be made in a Boolean value that represents true or false, or may be made by comparing numerical values (e.g., comparison against a given value).

Software, whether referred to as "software", "firmware", "middleware", "microcode", or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and the like.

Further, the software, instruction, information, and the like may be transmitted/received via a transmission medium. For example, when software is transmitted from a website, a server, or other remote sources using at least one of wired technology (a coaxial cable, an optical fiber cable, a twisted-pair cable, a digital subscriber line (DSL), and the like) and wireless technology (infrared light, microwaves, and the like), at least one of these wired technology and wireless technology is included in the definition of the transmission medium.

The terms "system" and "network" used in the present disclosure may be used compatibly. The "network" may mean an apparatus (e.g., a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be compatibly used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", "component carrier", and the like may be compatibly used. The base station is also sometimes referred to by a term such as a macro cell, a small cell, a femto cell, and a pico cell.

A base station may accommodate one or a plurality of (for example, three) cells. When a base station accommodates a plurality of cells, the entire coverage area of the base station can be partitioned into a plurality of smaller areas, and each smaller area can provide communication service through base station subsystems (e.g., indoor small base stations (remote radio heads (RRHs))). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", and "terminal" can be compatibly used.

A mobile station is also sometimes referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

At least one of the base station and the mobile station may be referred to as a transmission apparatus, a reception apparatus, a radio communication apparatus, and the like.

Note that at least one of the base station and the mobile station may be a device mounted on a moving body, a moving body itself, and the like. The moving body may be a transportation (e.g., a car, an airplane, and the like), an unmanned moving body (e.g., a drone, an autonomous car, and the like), or a (manned or unmanned) robot. Note that at least one of the base station and the mobile station also includes a device that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a structure in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-mentioned base station 10. In addition, terms such as "uplink" and "downlink" may be replaced with terms corresponding to communication between terminals (for example, "side"). For example, an uplink channel, a downlink channel, and the like may be replaced with a side channel.

Similarly, the user terminal in the present disclosure may be replaced with the base station. In the case, the base stations 10 may have the function of the above-mentioned user terminal 20.

In the present disclosure, the operation performed by the base station may be performed by an upper node thereof in some cases. In a network including one or a plurality of network nodes with a base station, it is clear that various operations performed so as to communicate with a terminal can be performed by a base station, one or a plurality of network nodes (e.g., mobility management entity (MME) and serving-gateway (S-GW) may be possible, but are not limiting) other than the base station, or a combination thereof.

The aspects/embodiments illustrated in the present disclosure may be used independently or in combination, and may be switched depending on execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented particular order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined (for example, a combination of LTE or LTE-A and 5G) and applied.

The phrase "based on" used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations may be used in the present disclosure only for convenience, as a method for distinguishing between two or more elements. Therefore, reference to the first and second elements does not mean that only two elements are adoptable, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Further, "determining" may be regarded as "determining" of receiving (for example, receiving of information), transmitting (for example, transmitting of information), input, output, accessing (for example, accessing to data in a memory), and the like.

Further, "determining" may be regarded as "determining" of resolving, selecting, choosing, establishing, comparing, and the like. In other words, "determining" may be regarded as "determining" of a certain operation.

Further, "determining" may be replaced with "assuming", "expecting", "considering", and the like.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced by "access".

In the present disclosure, when two elements are connected, these elements may be considered to be "connected" or "coupled" to each other by using one or more electrical wires, cables, printed electrical connections, and the like, and by using, as some non-limiting and non-inclusive examples, electromagnetic energy having a wavelength in the radio frequency domain, microwave domain, and optical (both visible and invisible) domain, and the like.

In the present disclosure, the phrase "A and B are different" may mean "A and B are different from each other". Note that the phrase may mean that "A and B are different from C". The terms such as "separated", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Therefore, the description in the present disclosure is provided for the purpose of describing examples, and thus, should by no means be construed to limit the invention according to the present disclosure in any way.

The invention claimed is:

1. A terminal comprising:
   a receiver that receives, in a physical downlink control channel (PDCCH) of a first cell, downlink control information (DCI) scheduling a downlink shared channel (PDSCH) of a second cell that is different from the first cell; and
   a processor that, when a control resource set (CORESET) associated with a search space set for cross-carrier scheduling is configured, assumes that transmission configuration indication (TCI) field information indicating whether the TCI field is present or absent in the DCI is set as enabled,
   wherein the processor controls reception of the PDCCH of the first cell and reception of the PDSCH of the second cell using a same TCI state.

2. The terminal according to claim 1, wherein when one or more TCI states configured for the second cell include information indicating a quasi-co-location (QCL) type D parameter, the processor assumes that a time offset between reception of the DCI and the PDSCH is larger than or equal to a threshold value.

3. The terminal according to claim 1, wherein the processor uses, for QCL assumption of the PDSCH, a TCI state with a lowest ID in an active bandwidth part (BWP) of the second cell.

4. A radio communication method for a terminal, comprising:
   receiving, in a physical downlink control channel (PDCCH) of a first cell, downlink control information (DCI) scheduling a downlink shared channel (PDSCH) of a second cell that is different from the first cell; and
   when a control resource set (CORESET) associated with a search space set for cross-carrier scheduling is configured, assumes that a transmission configuration indication (TCI) field information indicating whether the TCI field is present or absent in the DCI is set as enabled, and
   controlling reception of the PDCCH of the first cell and reception of the PDSCH of the second cell using a same TCI state.

5. A base station comprising:
   a transmitter that transmits, to a terminal, in a physical downlink control channel (PDCCH) of a first cell, downlink control information (DCI) scheduling a downlink shared channel (PDSCH) of a second cell that is different from the first cell; and
   a processor that, when a control resource set (CORESET) associated with a search space set for cross-carrier scheduling is configured in the terminal, assumes that a transmission configuration indication (TCI) field information indicating whether the TCI field is present or absent in the DCI is set as enabled,
   wherein the processor instructs the terminal to use a same TCI state for reception of the PDCCH of the first cell and reception of the PDSCH of the second cell.

6. A system comprising a terminal and a base station, wherein the terminal comprises:

a receiver that receives, in a physical downlink control channel (PDCCH) of a first cell, downlink control information (DCI) scheduling a downlink shared channel (PDSCH) of a second cell that is different from the first cell; and a processor that, when a control resource set (CORESET) associated with a search space set for cross-carrier scheduling is configured, assumes that a transmission configuration indication (TCI) field information indicating whether the TCI field is present or absent in the DCI is set as enabled, wherein the processor controls reception of the PDCCH of the first cell and reception of the PDSCH of the second cell using a same TCI state, and the base station comprises:
 a transmitter that transmits the DCI.

* * * * *